(No Model.) 2 Sheets—Sheet 1.

E. CRAWLEY & C. H. ALBRECHT.
HARNESS AND VEHICLE LOOP.

No. 273,820. Patented Mar. 13, 1883.

Attest:
J. Mc Strlhli
W. P. Gulick

Inventors.
Edwin Crawley and
Charles H. Albrecht
per Wm. Hubbell Fisher
Atty

N. PETERS, Photo-Lithographer, Washington, D. C.

(No Model.) 2 Sheets—Sheet 2.
E. CRAWLEY & C. H. ALBRECHT.
HARNESS AND VEHICLE LOOP.
No. 273,820. Patented Mar. 13, 1883.
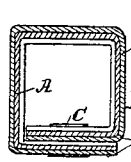
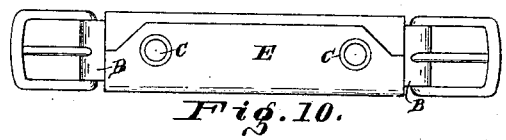
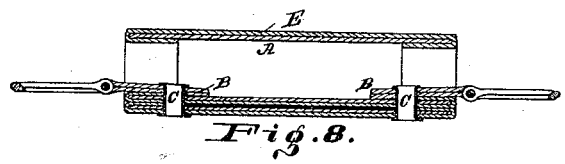
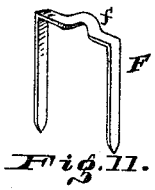
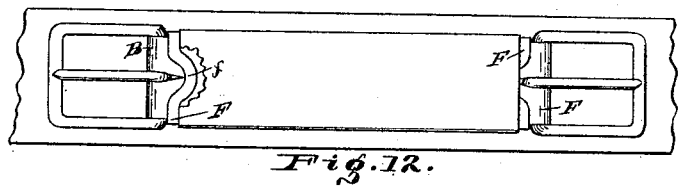
Attest:
J. Mw. Strubli
W. P. Gulick
Inventors.
Edwin Crawley and
Charles H. Albrecht
per Wm. Hubbell Fisher
Atty

UNITED STATES PATENT OFFICE.

EDWIN CRAWLEY, OF NEWPORT, KENTUCKY, AND CHARLES H. ALBRECHT, OF CINCINNATI, OHIO; SAID CRAWLEY ASSIGNOR TO SAID ALBRECHT.

HARNESS AND VEHICLE LOOP.

SPECIFICATION forming part of Letters Patent No. 273,820, dated March 13, 1883.

Application filed November 13, 1882. (No model.)

*To all whom it may concern:*

Be it known that we, EDWIN CRAWLEY, a resident of the city of Newport, in Campbell county, and State of Kentucky, and CHARLES H. ALBRECHT, a resident of the city of Cincinnati, in Hamilton county, and State of Ohio, have invented certain new and useful Improvements in Harness and Vehicle Loops, of which the following is a specification.
The principal objects of our invention are, first, to produce a loop for harness and vehicles which shall possess all of the principal advantages of both leather and metal loops; and, secondly, to provide a new and novel means for securing the loop to a strap, curtain, or other article.

Figure 6:
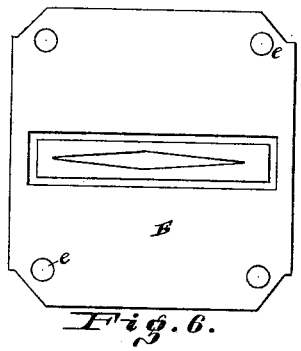
Figure 7:
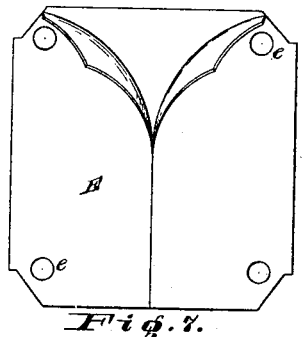
Figure 5:
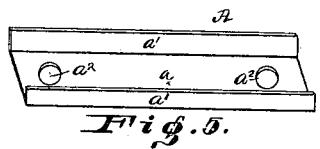
Figure 3:
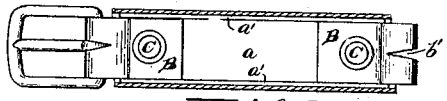
Figure 4:
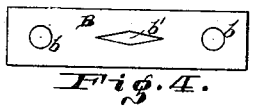
Figure 2:
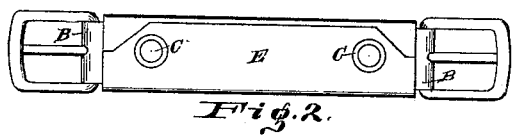
Figure 1:
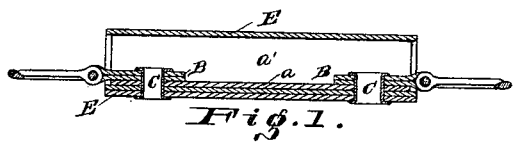

Referring to the drawings forming a part of this specification, Figure 1 is a longitudinal section through a completed loop, the buckle being attached. Fig. 2 is a view of the bottom of the loop. Fig. 3 affords a view of the loop, its bottom side being represented as resting on the sheet of drawings, and its top being removed to show the manner of connecting the buckles to the loop. Fig. 4 shows one of the straps by which the buckles are secured to the loop. Fig. 5 represents a preferred form of the metallic shells entering into the formation of the loop. Fig. 6 represents the outer surface of one of the leather covers for the loop. Fig. 7 represents the inner surface of said cover, showing the manner of its formation. Fig. 8 is a longitudinal section of a loop, showing a modification of the loop shown in Fig. 1. Fig. 9 is a transverse section of the loop shown in Fig. 8, and Fig. 10 is a bottom view of the same. Fig. 11 represents the preferred form of device for connecting, when desired, the loop to a curtain, strap, or other material; and Figs. 12 and 13 represent the manner of connecting the loop to such material by this device.

The shell or foundation A of the loop is made of thin sheet metal, and consists of a bottom, $a$, and the side flanges, $a'$, bent at right angles to the bottom $a$. This shell is stamped from a sheet of metal, and formed as shown, and in the process of stamping and forming holes $a^2$ are punched in the bottom $a$—one near each end.

Short straps B, of leather, for securing the buckles to the loop, are formed as shown in Fig. 4, having near each end a hole, $b$, and at the center a slit, $b'$, through which latter the tongue of the buckle passes. To each of these straps B is connected a buckle, after the manner shown in Fig. 3, the tongue of the buckle being passed through the slit $b'$ and the strap folded so that the holes $b$ will coincide with each other. One of these straps B, with its buckle attached, is placed in each end of the shell A so that the holes $b$ coincide with the holes $a^2$ of the shell, as shown in Fig. 3; or, if but one buckle is to be used in connection with the loop, then but one of these straps is to be placed in the shell. The buckle strap or straps are preferably placed on the inside of the loop, thus enabling the exterior of the loop to have a more finished appearance, and enabling the bottom proper of the loop to be brought closer to the article to which it is to be attached.

E represents the cover of the loop as it appears ready for being put around the shell A. The cover is made of leather and may be made of one thickness; but the preferred mode of making this cover is as follows: The leather is cut into strips of any desired length and of a width equal to twice the length of the loop. The sides of the strip are folded over and down, as shown in Fig. 7, in which figure, however, the corners are turned up to show that the cover is double. The sides so folded are held to place by suitable cement. When desirable any suitable material for the purpose of a stiffener may be placed on the wrong side of the leather and the sides of the strip then folded down, inclosing said material, all being cemented together. The strip thus folded is passed under a die, and out of said strip the covers are cut in shape, and at the same time the corner-holes $e$ are punched. If the covers are to be ornamented with an embossed design, the latter may be impressed upon them while being cut; or the covers may be embossed in a subsequent operation. The corner-holes $e$, at each end, coincide with each other and with the holes $a^2$ in the shell when the cover is placed around said shell. The cover, whether of one or more thicknesses, having been prepared as described, is wrapped around the shell A, a finished edge—that is, an edge, W, of the fold—being at each end of the loop, and an eyelet or rivet, C, passed through the holes $e$ of the cover, the holes $a^2$ of the shell, and the holes $b$ of the buckle-strap B, and the ends riveted down by suitable instruments, thus firmly securing the cover around the shell, forming the loop, and securing the buckles to said loop. The shell A being open at the top and the leather cover enveloping the shell imparts the appearance of an ordinary leather loop. The cover E preferably extends a slight distance beyond the ends of the shell A, as shown, so that the latter is not at all visible. The loop thus formed is commonly to be secured to the strap or carriage top or other article, and the preferable method of so securing it is by the use of staples F, one of which is placed at each end of the loop, as shown in Fig. 12, one end of the staple passing at each side of the strap B and through the strap, curtain, or other article, and clinched, as shown in Fig. 12. The connecting or middle portion of the staple F is curved, as at $f$, to allow the tongue of the buckle to have free play.

Instead of the staple F, any other suitable means and modes of attaching the loop to the strap, &c., may be employed. Where an eyelet C is present, a rivet may be passed through it and through the strap, curtain, or other article, and riveted down. As a means of connecting the loop to the strap, &c., we prefer to employ the staple.

Figs. 8, 9, and 10 represent a modification of our invention as already described. In the modification the metal shell A is in the form of a continuous loop, and the sides are brought together at the bottom of the loop, one overlapping the other, and are secured together by the eyelets or rivets C, after the manner already described. In this case the cover E is not folded, as before described, and preferably it is cemented on the metal sheet which is to form the loop, and if thus cemented it is cemented to the sheet before the latter is bent into a loop, and the ends of the cover are, for the purpose of a finish, turned over the ends of the sheet, as shown in Fig. 8.

So far as pertains to that feature of our invention which consists of the shell A, in combination with the cover E and the buckle strap or straps B, made separate from the case and all secured together, the metal shell A may have a top.

Having thus described our invention, what we claim as new, and desire to secure by Letters Patent, is as follows:

1. The shell A, having bottom $a$ and flanges or sides $a'$, in combination with the cover E and the buckle strap or straps B, made separate from the cover, all secured together by the rivets or eyelets C, substantially as and for the purposes specified.

2. The combination of a harness or vehicle loop, constructed substantially as described, and the staple F, having bent portion $f$, substantially as and for the purposes specified.

3. In a loop composed of a supporting metal frame-work covered with a pliable cover, the short strap-piece B, located at the inside of the loop, and a rivet or eyelet forming the means of connecting the strap, frame-work, and cover together, substantially as and for the purposes specified.

4. In a loop, a supporting metal frame-work and a cover, of leather or other pliable material, consisting of a sheet whose ends are folded toward the center, substantially as described, the whole sheet thus folded being applied to said frame-work, the edges W of the fold being at the end of the loop, substantially as and for the purposes specified.

5. In a loop, a supporting metal frame, and a leather cover consisting of a sheet of leather or other pliable material whose ends are folded toward the center, substantially as described, the corners of the sheet thus folded being perforated at $e$, and the sheet being wrapped around the metal frame-work, and said cover and the buckle-connection being connected together by rivets or eyelets passing through said perforations in the cover and straps, thus holding the cover in position and the strap in place, substantially as and for the purposes specified.

6. A loop consisting of a metal shell, A, having bottom $a$ and flanges or sides $a'$, and open at top, in combination with a cover, of leather or other pliable material, arranged to form the top of the loop and incase the sides, substantially as and for the purposes specified.

EDWIN CRAWLEY.
CHAS. H. ALBRECHT.

Witnesses:
A. S. LUDLOW,
E. R. HILL.